United States Patent Office 3,480,453
Patented Nov. 25, 1969

3,480,453
OPTICAL GLASS
Alexander Mailer Reid, St. Helens, Richard John Parry, Upholland, and Michael Eastoe Burrows, Reigate, Surrey, England, assignors to Pilkington Brothers Limited, Liverpool, England, a corporation of Great Britain
No Drawing. Filed Sept. 8, 1966, Ser. No. 577,800
Claims priority, application Great Britain, Sept. 13, 1965, 39,029/65
Int. Cl. C03c 3/14, 3/30
U.S. Cl. 106—47                                    9 Claims

ABSTRACT OF THE DISCLOSURE

Optical glass having a reduced partial dispersion at the blue end of the spectrum without corresponding reduction in partial dispersion at the centre and red end of the spectrum, contains boric oxide, lead oxide, alumina and optional ingredients chosen from silica, alkali metal oxide, titania and other compatible oxides.

---

This invention relates to optical glass, and it is a main object of this invention to provide novel optical glasses having a reduced partial dispersion at the blue end of the spectrum without a corresponding reduction in the partial dispersions at the centre of the spectrum and at the red end thereof.

In choosing an optical glass for a particular use, reference is made to the mean refractive index ($n_g$) of the glass, that is to say the refractive index of the glass for the green mercury line $e$ at 5461 Angstroms, its mean dispersion, ($n_{F'} - n_{C'}$), that is to say the difference between the refractive index ($n_{F'}$) for the blue cadmium line F' at 4800 Angstroms and the refractive index ($n_{C'}$) for the red cadmium line C' at 6438 Angstroms, as well as its partial dispersions over different parts of the spectrum, for example $n_d - n_c$, $n_f - n_d$, $n_g - n_e$, etc. The other lines at which the refractive index of the glass is measured to determine these partial dispersions are the yellow helium line $d$ at 5876 Angstroms and the blue mercury line $g$ at 4358 Angstroms.

The three partial dispersions mentioned above are partial dispersions over the red end of the spectrum, a fairly central part of the spectrum, and the blue end of the spectrum respectively.

Alternatively, there may be used to select a desired glass for a particular optical application, the relative dispersion $V_e$ which equals $n_e - 1/n_{F'} - n_{C'}$ and the relative partial dispersions $\theta_{eC'}$, $\theta_{F'e}$, $\theta_{ge}$, each of which is given by the partial dispersion divided by the mean dispersion, i.e. $\theta_{ge}$ is $n_g - n_e/n_{F'} - n_{C'}$.

The present invention is concerned with providing an optical glass having a reduced partial dispersion and relative partial dispersion at the blue end of the spectrum without any substantial alteration in the mean refractive index of the glass or the partial dispersions in the other parts of the spectrum.

According to the present invention, there is provided an optical glass having a refractive index ($n_e$) between 1.520 and 1.540, a relative dispersion ($V_e$) from 50.0 to 53.0 and a relative partial dispersion ($\theta_{ge}$) from 0.980 to 1.00.

The refractive index $n_e$ is the refractive index of the glass for the green mercury line at 5461 Angstroms and the relative dispersion $V_e$ is given by the formula $n_e - 1/n_{F'} - n_{C'}$.

From another aspect the present invention provides an optical glass containing, by weight, as essential ingredients, from 40% to 75% of boric oxide ($B_2O_3$), from 7% to 24% of lead oxide (PbO), from 6% to 14% of alumina ($Al_2O_3$), and, as optional ingredients, not more than 33% of silica ($SiO_2$), not more than 7.5% of alkali metal oxide ($Na_2O$ or $K_2O$), not more than 3.5% of titania ($TiO_2$) and not more than 7.5% of other compatible oxides. Preferred compatible oxides are for example, antimony oxide ($Sb_2O_3$) and tantalum oxide ($Ta_2O_5$).

Advantageously, optical glass according to the present invention consists essentially of, by weight, from 40% to 75% of boric oxide ($B_2O_3$), from 7% to 24% of lead oxide (PbO), from 6% to 14% of alumina ($Al_2O_3$) and from 5% to 30% of silica ($SiO_2$), and there may additionally be present up to 7% of an alkali metal oxide, preferably sodium oxide ($Na_2O$).

Further according to the present invention, an optical glass having these characteristics consists of, by weight, from 41% to 69% of boric oxide ($B_2O_3$), from 10% to 22% of lead oxide (PbO), from 6% to 14% of alumina ($Al_2O_3$), from 0% to 30% of silica ($SiO_2$), from 0% to 7.5% of alkali metal oxide ($Na_2O$ or $K_2O$), and from 0% to 3% of titania ($TiO_2$).

More particularly according to this aspect of the invention, there is provided an optical glass consisting essentially of, by weight, from 41% to 69% of boric oxide ($B_2O_3$), from 10% to 22% of lead oxide (PbO), from 6% to 14% of alumina ($Al_2O_3$), from 5% to 30% of silica ($SiO_2$), from 0% to 7.5% of alkali metal oxide ($Na_2O$ or $K_2O$) and from 0% to 3% of titania ($TiO_2$).

Desirably an optical glass according to the present invention has a relative dispersion $V_e$ of the order 51 to 51.5 and the present invention also comprehends an optical glass having such a $V_e$ value and consisting of, by weight, from 41% to 69% of boric oxide ($B_2O_3$), from 10% to 22% of lead oxide (PbO), from 6% to 14% of alumina ($Al_2O_3$), from 3% to 4% of alkali metal oxide ($Na_2O$ or $K_2O$), from 0% to 28% of silica ($SiO_2$), from 0% to 3% of titania ($TiO_2$), from 0% to 3% of tantalum oxide ($Ta_2O_5$).

More specifically according to this aspect, the present invention provides an optical glass consisting essentially of, by weight, from 41% to 59% of boric oxide ($B_2O_3$), from 10% to 12% of lead oxide (PbO), from 13% to 14% of alumina ($Al_2O_3$), from 10% to 28% of silica ($SiO_2$), from 3.0% to 3.5% of alkali metal oxide ($Na_2O$) and from 2.0% to 2.5% of titania ($TiO_2$).

Still further according to the invention an optical glass consists of, by weight, from 41% to 69% of boric oxide ($B_2O_3$), from 10% to 22% of lead oxide (PbO), from 6% to 14% of alumina ($Al_2O_3$), from 3% to 4% of alkali metal oxide ($Na_2O$ or $K_2O$), from 0% to 28% of silica ($SiO_2$), from 0% to 3% of titania ($TiO_2$) and from 1% to 7.5% antimony oxide ($Sb_2O_3$).

As is well known, the refractive properties of any glass depend on its thermal history during annealing, and there is a general tendency for the refractive index of a glass to rise during the annealing process. Preferably optical glasses are annealed by cooling at a rate of 20° C. per day through the annealing range, and the glass which has been annealed in this way usually has a refractive index from 0.002 to 0.004 higher than a glass which has not been subjected to this fine annealing.

With optical glasses according to the invention, it is found that there is also a tendency for the relative dispersion $V_e$ to increase during the fine annealing of the glass by cooling at 20° C. per day, and according to a particular feature of the present invention, this undesired increase in $V_e$ is decreased or eliminated by using an optical glass consisting essentially of, by weight, from 53% to 69% of boric oxide ($B_2O_3$), from 16% to 22% of lead oxide (PbO), from 6% to 13% of alumina ($Al_2O_3$), from 0% to 16% of silica ($SiO_2$) and from 0% to 8% of alkali metal oxide ($Na_2O$ or $K_2O$).

The optical glass according to the present invention can be made by fusion of a batch containing the constituents hereinbefore mentioned in proportions which will give rise to a glass having a composition within the ranges set forth, followed by subsequent manipulation by normal optical glass making techniques.

It will be understood that the common glass making practice has been adopted in which the composition of the glass is expressed in terms of the oxides of the various elements present and the materials used in the batch from which the optical glass is made need not necessarily be oxides and may be other compounds which are converted to oxides during the melting process, for example, it is convenient to use sodium carbonate instead of sodium oxide and boric acid instead of boric oxide.

It has been indicated above that small proportions, not more than 7.5% in total, of other compatible oxides may be included in an optical glass according to the invention, and examples of suitable compatible oxides not previously mentioned are niobium oxide ($Nb_2O_5$) and zirconium oxide ($ZrO_2$). However, small proportions of the oxides of lithium, magnesium, calcium, strontium, zinc, cadmium and arsenic may be added.

In order that the present invention may be more fully understood, there are listed in the following tables, by way of illustration, preferred compositions and the relevant optical properties of examples of optical glasses according to the invention, the proportions being percentages by weight.

Table 1 gives the glass compositions of the various examples, and Table 2 sets out the relevant optical properties of glasses having those same compositions.

The following is given as a specific method of producing an optical glass as set forth in Example No. 1 above.

A glass batch having the composition 50.1 gms. $B_2O_3$, 18.8 gms. $SiO_2$, 4.7 gms. $Na_2O$, 6.0 gms. $Al_2O_3$, 20.4 gms. PbO was heated in a platinum crucible in an electric furnace at 1450° C. until the batch was completely fused. The batch was then stirred for half an hour in order to facilitate complete intermixing and reaction of the batch ingredients. In order to anneal the glass, the melt is cast into a mould previously heated to 650° C. and is then cooled down slowly to room temperature at a rate of 1.5° C. per minute.

The glass is subsequently fine annealed by being heated to a temperature of about 500° C. and then cooled at a rate of 20° C. per day to a temperature of about 400° C. followed by cooling at a rate of 1.5° C. per minute to room temperature.

Minor alterations in the percentage compositions of the glasses given in the examples, will produce corresponding minor differences in the optical properties of the resulting glass.

Optical glasses in accordance with any of the examples of the present invention exhibit a shortened partial dispersion in the blue region of the spectrum and have sufficient chemical durability to be ground and polished.

The optical glasses in accordance with the present invention may be used in special optical systems and have particular application in apparatus for colour photography and in particular in colour photographic apparatus using variable, i.e. moveable, lenses.

TABLE 1

| Example No. | $B_2O_3$ | $SiO_2$ | $Na_2O$ | $K_2O$ | $Al_2O_3$ | PbO | $TiO_2$ | $Ta_2O_3$ | $Sb_2O_3$ |
|---|---|---|---|---|---|---|---|---|---|
| 1 | 50.1 | 18.8 | 4.7 | | 6.0 | 20.4 | | | |
| 2 | 61.8 | 5.0 | | | 12.1 | 21.1 | | | |
| 3 | 59.6 | 7.1 | | | 12.1 | 21.2 | | | |
| 4 | 68.7 | | 3.7 | | 6.1 | 21.5 | | | |
| 5 | 64.3 | 5.2 | 1.5 | | 12.5 | 16.5 | | | |
| 6 | 65.4 | 5.3 | 1.6 | | 12.8 | 13.9 | 1.0 | | |
| 7 | 68.1 | | 3.0 | | 12.5 | 16.4 | | | |
| 8 | 71.9 | | 3.2 | | 13.2 | 8.6 | 3.1 | | |
| 9 | 64.2 | 3.7 | 3.1 | | 12.5 | 16.5 | | | |
| 10 | 60.3 | 7.4 | 3.1 | | 12.6 | 16.6 | | | |
| 11 | 57.9 | 15.4 | 3.2 | | 6.5 | 17.0 | | | |
| 12 | 65.4 | 3.8 | 3.1 | | 12.8 | 13.9 | 1.0 | | |
| 13 | 66.6 | 3.8 | 3.2 | | 13.0 | 11.4 | 2.0 | | |
| 14 | 53.7 | 15.4 | 7.2 | | 6.6 | 17.1 | | | |
| 15 | 67.8 | 3.9 | 3.2 | | 11.8 | 11.2 | 2.1 | | |
| 16 | 58.4 | 11.6 | 3.2 | | 13.2 | 11.5 | 2.1 | | |
| 17 | 50.1 | 19.6 | 3.2 | | 13.3 | 11.7 | 2.1 | | |
| 18 | 41.5 | 27.8 | 3.3 | | 13.5 | 11.8 | 2.1 | | |
| 19 | 49.6 | 19.5 | 3.2 | | 13.3 | 12.3 | 2.1 | | |
| 20 | 45.9 | 23.6 | 3.3 | | 13.4 | 11.7 | 2.1 | | |
| 21 | 45.1 | 23.4 | 3.2 | | 13.2 | 10.1 | 2.1 | 2.9 | |
| 22 | 44.9 | 24.5 | 3.3 | | 13.4 | 11.8 | 2.1 | | |
| 23 | 45.0 | 23.3 | | 4.9 | 13.2 | 11.5 | 2.1 | | |
| 24 | 45.03 | 22.20 | | 3.02 | 11.74 | 15.51 | 0.5 | | 2.00 |
| 25 | 45.03 | 22.20 | | 3.02 | 10.74 | 16.51 | 0.5 | | 2.00 |
| 26 | 45.03 | 21.20 | | 3.02 | 10.74 | 13.01 | | | 7.00 |

TABLE 2

| Example No. | $n_e$ | $V_e$ | $\theta_{ge}$ |
|---|---|---|---|
| 1 | 1.53845 | 51.42 | 1.0000 |
| 2 | 1.53567 | 49.97 | 0.9904 |
| 3 | 1.53756 | 50.22 | 0.9988 |
| 4 | 1.54484 | 50.7 | 0.9940 |
| 5 | 1.53032 | 52.25 | 0.9920 |
| 6 | 1.53032 | 52.25 | 0.9917 |
| 7 | 1.53380 | 52.45 | 0.9911 |
| 8 | 1.53106 | 50.20 | 0.9976 |
| 9 | 1.53318 | 52.10 | 0.9813 |
| 10 | 1.53133 | 52.41 | 0.9949 |
| 11 | 1.52498 | 52.72 | 0.9912 |
| 12 | 1.53178 | 51.76 | 0.9953 |
| 13 | 1.53091 | 50.89 | 0.9952 |
| 14 | 1.53322 | 53.00 | 0.9940 |
| 15 | 1.52951 | 50.99 | 0.9968 |
| 16 | 1.52908 | 51.44 | 0.9919 |
| 17 | 1.52779 | 51.14 | 0.9977 |
| 18 | 1.52689 | 51.23 | 0.9899 |
| 19 | 1.52906 | 50.98 | 0.9936 |
| 20 | 1.52968 | 50.41 | 0.9897 |
| 21 | 1.52912 | 50.51 | 0.9951 |
| 22 | 1.52641 | 51.37 | 0.9999 |
| 23 | 1.52161 | 51.55 | 0.9933 |
| 24 | 1.52625 | 51.85 | 0.9970 |
| 25 | 1.52888 | 51.20 | 0.9970 |
| 26 | 1.531029 | 50.15 | 0.9897 |

We claim:

1. An optical glass consisting of, by weight, as essential ingredients, from 40% to 75% of boric oxide ($B_2O_3$), from 7% to 24% of lead oxide (PbO), from 6% to 14% of alumina ($Al_2O_3$) and, as optional ingredients, not more than 33% of silica ($SiO_2$), not more than 7.5% of alkali metal oxide ($Na_2O$ or $K_2O$), not more than 3.5% of titania ($TiO_2$) and not more than 7.5% of other compatible oxides, said glass having a refractive index ($n_e$) between 1.520 and 1.540, a relative dispersion ($V_e$) from 50.0 to 53.0 and a relative partial dispersion ($\theta_{ge}$) from 0.980 to 1.00.

2. An optical glass according to claim 1 consisting essentially of, by weight, from 40% to 75% of boric oxide ($B_2O_3$), from 7% to 24% of lead oxide (PbO), from 6% to 14% of alumina ($Al_2O_3$) and from 5% to 30% of silica ($SiO_2$).

3. An optical glass according to claim 1 consisting essentially of, by weight, from 40% to 75% of boric oxide ($B_2O_3$), from 7% to 24% of lead oxide (PbO), from 6% to 14% of alumina ($Al_2O_3$), from 5% to 30% of silica ($SiO_2$) and up to 7% of alkali metal oxide ($Na_2O$ or $K_2O$).

4. An optical glass according to claim 1 consisting of, by weight, from 41% to 69% of boric oxide ($B_2O_3$), from 10% to 22% of lead oxide (PbO), from 6% to 14% of alumina ($Al_2O_3$), from 0% to 30% of silica ($SiO_2$), from 0% to 7.5% of alkali metal oxide ($Na_2O$ or $K_2O$) and from 0% to 3% of titania ($TiO_2$).

5. An optical glass according to claim 1 consisting essentially of, by weight, from 41% to 69% of boric oxide ($B_2O_3$), from 10% to 22% of lead oxide (PbO), from 6% to 14% of alumina ($Al_2O_3$), from 5% to 30% of silica ($SiO_2$), from 0% to 7.5% of alkali metal oxide ($Na_2O$ or $K_2O$) and from 0% to 3% of titania ($TiO_2$).

6. An optical glass according to claim 1 consisting of, by weight, from 41% to 69% of boric oxide ($B_2O_3$), from 10% to 22% of lead oxide (PbO), from 6% to 14% of alumina ($Al_2O_3$), from 3% to 4% of alkali metal oxide ($Na_2O$ or $K_2O$), from 0% to 28% of silica ($SiO_2$), from 0% to 3% of titania ($TiO_2$), from 0% to 3% of tantalum oxide ($Ta_2O_5$).

7. An optical glass according to claim 1 consisting of, by weight, from 41% to 69% of boric oxide ($B_2O_3$), from 10% to 22% of lead oxide (PbO), from 6% to 14% of alumina ($Al_2O_3$), from 3% to 4% of alkali metal oxide ($Na_2O$ or $K_2O$), from 0% to 28% of silica ($SiO_2$), from 0% to 3% of titania ($TiO_2$) and from 1% to 7.5% antimony oxide ($Sb_2O_3$).

8. An optical glass according to claim 1 consisting essentially of, by weight, from 41% to 59% of boric oxide ($B_2O_3$), from 10% to 12% of lead oxide (PbO), from 13% to 14% of alumina ($Al_2O_3$), from 10% to 28% of silica ($SiO_2$), from 3.0% to 3.5% of alkali metal oxide ($Na_2O$) and from 2.0% to 2.5% of titania ($TiO_2$).

9. An optical glass according to claim 1 consisting essentially of, by weight, from 53% to 69% of boric oxide ($B_2O_3$), from 16% to 22% of lead oxide (PbO), from 6% to 13% of alumina ($Al_2O_3$), from 0% to 16% of silica ($SiO_2$) and from 0% to 8% of alkali metal oxide ($Na_2O$ or $K_2O$).

References Cited

UNITED STATES PATENTS 2,511,228   6/1950   Sun et al. _____ 106—47

OTHER REFERENCES

"Optical Glass—Tables of Characteristics," Jenaer Glaswerkschott etc., pp. 42 and 43.

TOBIAS E. LEVOW, Primary Examiner

MARK L. BELL, Assistant Examiner

U.S. Cl. X.R.

106—53, 54

PO-1050
(5/69)

UNITED STATES PATENT OFFICE
CERTIFICATE OF CORRECTION

Patent No. 3,480,453      Dated November 25, 1969

Inventor(s) Alexander Mailer Reid, Richard John Parry and Michael Eastoe Burrows It is certified that error appears in the above-identified patent and that said Letters Patent are hereby corrected as shown below:

Column 1, line 30, "index $(n_g)$" should read --index $(n_e)$-- line 38, "$n_c$" should read --$n_{C'}$--

"$n_f$" should read --$n_{F'}$--

In Table 1 "$Ta_2O_3$" should read --$Ta_2O_5$--

In Table 2 Example No. 9, the last number should read --0.98

Example 10, the last number should read --0.9943--

SIGNED AND
SEALED
JUN 2 1970

(SEAL)
Attest:

Edward M. Fletcher, Jr.
Attesting Officer

WILLIAM E. SCHUYLER, JR.
Commissioner of Patents